Patented July 11, 1950

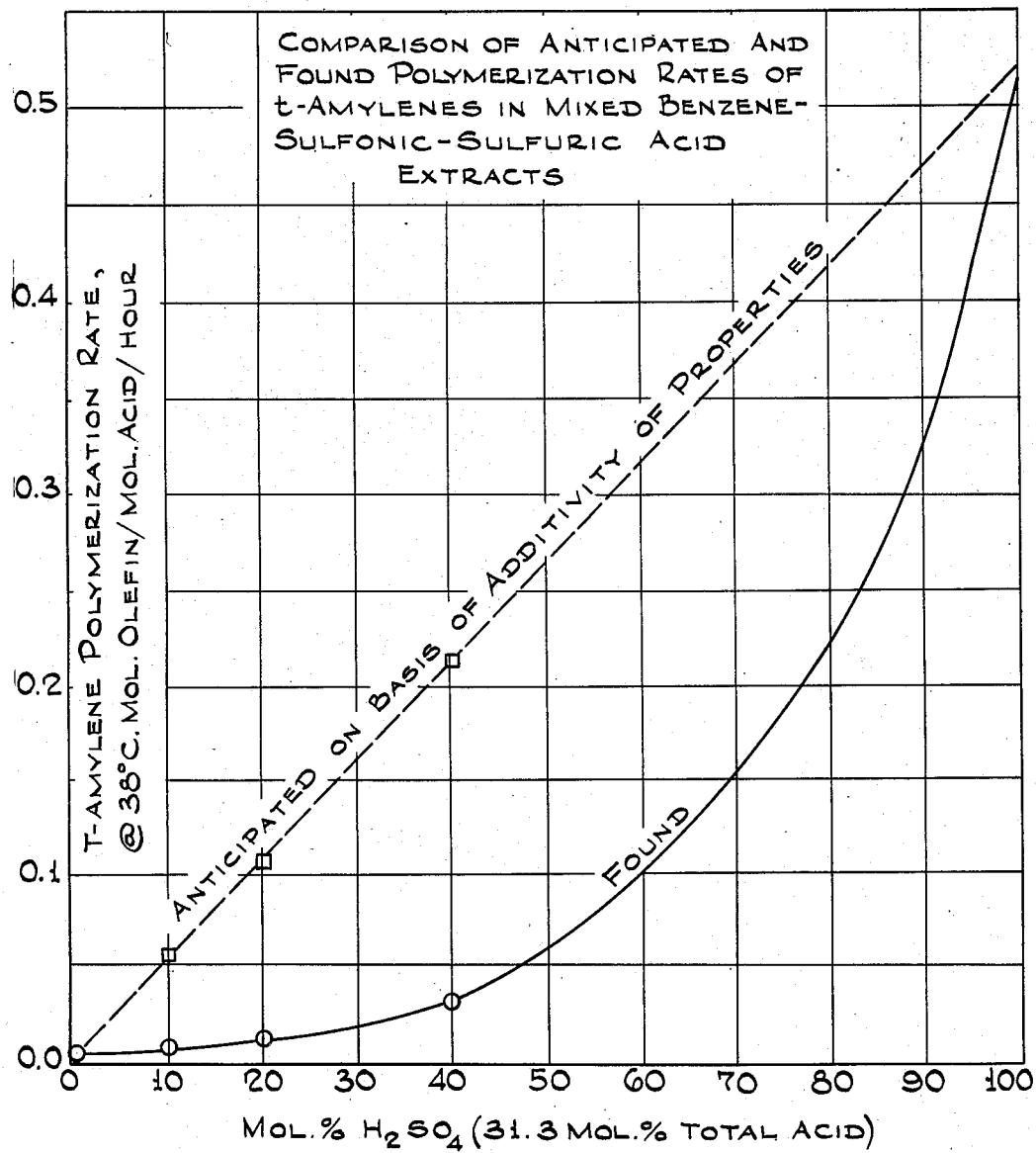

2,515,006

UNITED STATES PATENT OFFICE 2,515,006

MODIFIED ACID FOR TERTIARY OLEFIN EXTRACTION

Boyd E. Hudson, Jr., Cranford, N. J., assignor to Standard Oil Development Company, a corporation of Delaware Application January 2, 1948, Serial No. 247

11 Claims. (Cl. 260—677)

1

The present invention relates to the extraction of tertiary olefins in aqueous solutions of acids and more particularly to methods of selectively absorbing tertiary olefins (e. g. from petroleum refinery gases) in organic sulfonic acids modified by the presence of a polybasic mineral acid-acting substance such as sulfuric acid, phosphoric acid etc. and salts of such acids, in amounts specified below.

Refinery gases are composed primarily of hydrocarbons of varying molecular weights although there is some hydrogen as well as other products present. In the processing of these refinery gases in order to obtain as many useful products as possible, they are first roughly separated by fractional distillation into fractions of different boiling ranges. By careful manipulation fractions may be obtained which are composed predominantly of hydrocarbons having the same number of carbon atoms to the molecule as, for example debutanizer gas or $C_4$ cut. Although these fractions of narrow boiling range are composed predominantly of hydrocarbons having the same number of carbon atoms, they are mixtures with respect to the structure of the various molecules. As, for example, the $C_4$ cut contains isobutylene, normal butenes, isobutane and normal butane. Consequently, a chemical reaction conducted with even a close cut refinery gas gives a reaction product which is a mixture of derivatives, which generally are as difficult of separation as were the hydrocarbons in the original fraction.

Separation and recovery of the isomeric olefins which form the major part of the reactive materials within a refinery gas fraction by fractional distillation is extremely difficult and practically impossible of accomplishment. Resort then has been made to chemical reactions to secure the selective removal of reactive hydrocarbons from fractions of refinery gases of which Brooks, U. S. Patent 1,970,687 is exemplary. These prior processes are based primarily upon the observation that some olefins are more reactive with sulfuric acid than are others, as, for example tertiary olefins are more reactive than are secondary or normal olefins. Thus by using a dilute sulfuric acid maintained within a narrow range of acid strength and at low temperatures, it was found that more tertiary olefin reacted than normal olefin, and a separation of the olefins could thus be obtained. In such methods the temperature had to be maintained at 15° C. or below, otherwise the selectivity of the process was lost. The maintenance of a temperature of

2

15° C. or less is costly due to the refrigeration required. Tertiary olefins are very reactive to sulfuric acid and even with the dilute solutions of sulfuric acid and low temperatures employed, polymerization of the tertiary olefins and copolymerization of the tertiary olefins with normal olefins, occur along with side reactions involving oxidation and sulfonation, instead of the desired esterification or olefin hydration.

The primary object of the present invention is an improved method for the separation of isomeric olefins. It is another object of this invention to provide a method for the selective extraction of tertiary olefins from hydrocarbon mixtures while maintaining losses of tertiary olefins due to polymerization and/or copolymerization with other olefins at a minimum. Other and further objects will be apparent to those skilled in the art upon reading the following description.

According to the present invention, tertiary olefins are absorbed to the substantial exclusion of normal olefins in an aqueous solution of a mixture of an organic sulfonic acid and a polybasic mineral acid-acting substance, said mixture containing 20 to 45 mol per cent total acid, of which the polybasic mineral acid-acting substance is present in amounts from 10 to 75 mol per cent of the total acids.

It is, of course, well known that tertiary olefins undergo direct hydration under the influence of aqueous solutions of strong acids to form the corresponding alcohols. When the proper acid is used and its strength and the operating temperature are well adjusted, the alcohol formed is retained in the acid phase, and extraction of the tertiary olefin is thus accomplished. Other olefins also react with acids such as sulfuric or benzenesulfonic, but by a different mechanism and much more slowly, so that tertiary olefins may be extracted selectively. The extraction of tertiary olefins can be carried only to a finite extent, i. e., to the point of equilibrium. Low temperatures favor good equilibrium extraction cleanup, and also low losses of extracted olefin due to polymerization. High acid strengths also favor good cleanup, but lead to high polymerization losses. Moreover, not all acids are equivalent with respect to the equilibrium extraction cleanup vs. polymerization loss relationship. The superiority of benzenesulfonic acid over the more conventional sulfuric acid for the extraction and recovery of tertiary amylenes has been well recognized.

It has been found that by mixing substantial amounts of a polybasic mineral acid-acting substance such as sulfuric acid with benzenesulfonic acid, certain desirable properties of the former acid are realized, and at the same time, many other desirable properties of the latter acid are attained. Inasmuch as these properties appear to be extremely non-linear in additivity, the resultant properties of the mixtures are wholly unexpected, new and novel. Specifically, it has been found that mixtures of benzenesulfonic and sulfuric acid cause far less polymerization loss than would be estimated from data on the two acids taken singly, and that the mixed acids extract tertiary olefins as effectively as benzenesulfonic alone, sulfuric alone being vastly inferior.

Since a small change in the amount of water in the acid extractant causes relatively large changes in its properties, the molar water concentration was held constant in studying the properties of the mixed acids, in order to avoid confusion in the results due to the effect of water. More exactly, the acid mixtures were made from 80 wt. per cent benzenesulfonic acid, and 71.5 wt. per cent sulfuric acid, each of which contains 31.3 mol per cent acid and 68.7 mol per cent water. The mixtures all contain therefore, 31.3 mol per cent total acid and 68.7 mol per cent water; the proportions of benzenesulfonic acid and sulfuric acid are conveniently expressed as mol per cent sulfuric on a total acid basis.

The rate of polymerization of tertiary amylenes by 71.5% wt. sulfuric acid at 38° C. is too rapid for accurate direct measurement. It is estimated from work with 55%, 60% and 65% (by weight) sulfuric acid, that the 71.5% acid polymerizes t-amylenes at a rate of 0.52 mol of olefin per mol of acid per hour (on this basis, polymerization rate is essentially independent of the concentration of olefin in the extract). At the same temperature, 80 wt. per cent benzenesulfonic acid polymerizes t-amylenes two orders of magnitude more slowly, approximately 0.004 mol olefin per mol of acid per hour. Polymerization rates measured with the two acids, mixed in various proportions are tabulated below, along with rates calculated for the mixtures on the basis of additivity of the properties of the acids taken singly.

*Polymerization rates of t-amylenes in mixed benzenesulfonic-sulfuric acid extracts*

31.3 mol per cent total acid, 38° C.
(80 wt. per cent benzenesulfonic, 71.5 wt. per cent sulfuric)
Initial olefin content, 1 mol/mol acid

| Polymerization Rate Mols olefin/mol acid/hr. | Mol Per Cent H₂SO₄ on Total Acid ||||| 
|---|---|---|---|---|---|
| | 0 | 10 | 20 | 40 | 100 |
| Measured | 0.0047 0.0033 | 0.0074 | 0.0138 | 0.0322 | 0.52 est. |
| Calculated | 0.004 | 0.056 | 0.108 | 0.218 | 0.52 |

The synergistic reduction of polymerization rate below what is anticipated is illustrated more vividly in the drawing where it is noted that the anticipated rate is 3.5 to 6 times as great as the observed rate in the range of 10 to 60 mol per cent sulfuric in the combined acid.

The extractive property of the acid used to selectively extract tertiary olefins is, of course, of prime importance. It has been found that the total vapor pressures above acid-t-amylene extracts at a particular temperature are approximately proportional to the mol per cent t-olefin contained in hydrocarbon phases in equilibrium with those extracts at the same temperature, or at some other fixed temperature. Moreover, the total vapor pressure is approximately proportional to the olefin content of the extract, which simply reaffirms that a lean extract is capable of better equilibrium extraction changes than a fat one. By measuring the total vapor pressures of t-amylene extracts at a fixed temperature and at fixed olefin contents ("extract saturation") it has been found that the introduction of substantial amounts of sulfuric acid with benzenesulfonic acid essentially does not alter the good extractive property of the benzenesulfonic acid.

*Total vapor pressures of mixed-acid extracts of t-amylenes at 25° C. (mm. Hg)*

| Olefin Content, Mol/mol acid | Mol Per Cent H₂SO₄ on combined acid ||||
|---|---|---|---|---|
| | 0 | 5 | 10 | 20 |
| 0.20 | 16.5 16.7 16.6 | | 16.6 16.3 | 16.9 16.4 |
| 0.50 | 51.1 48.9 | 48.3 47.3 | | 48.3 47.2 45.5 |

As previously mentioned, a tertiary olefin extraction process should be operated at as low a temperature as refrigeration costs permit, in order to secure the highest degree of extraction and to minimize polymerization losses. The freezing point of the extract places a definite lower limit on operating temperatures. The table below shows that, although the mixed benzenesulfonic-sulfuric acid freezes at a somewhat higher temperature than benzenesulfonic alone when no olefin is present, the introduction of sulfuric acid does not affect the freezing point of olefin extracts.

*Melting points, ° C., of t-amylene extract 31.3 mol per cent combined acids*

| Olefin Content, Mol/mol acid | Mol Per Cent H₂SO₄ on Total Acid |||||||| 
|---|---|---|---|---|---|---|---|---|
| | 0 | 5 | 10 | 20 | 40 | 60 | 80 | 90 |
| 0.0 | 15–17 | 22.5 | 24.5 | 23.5 | 22.3 | 22 | 16–17 | 13.5 |
| 0.2 | 2–5 | | 5 | 2 | | | | |
| 0.5 | –6 | | –6 | –6 | | | | |

In the practice of the present invention the raw materials used are close cut refinery gases such as C₄ cut, C₅ cut or those fractions composed of even higher molecular weight hydrocarbons, up to 12 carbon atoms, particularly the C₄ to C₈ range containing both tertiary and normal olefins as well as saturated hydrocarbons. The C₄ and C₅ cuts are fractions of petroleum hydrocarbons composed predominantly of hydrocarbons having 4 or 5 carbon atoms to the molecule respectively. Selective removal of the tertiary olefin is accomplished by passing the mixture of hydrocarbons, either in a gaseous or liquid state, into an aqueous solution of a mixture of a strong organic sulfonic acid of from 55–90 wt. percent strength and a polybasic mineral acid, said mixture containing 20 to 45 mol per cent total acid of which 10 to 75%, preferably 10 to 50%, represents the polybasic mineral acid. The mixed acid is maintained at a temperature between 0°–50° C. under a pressure at least equal to the vapor pressure of the hydrocarbon mixture at the temperature employed. The preferred range of sulfonic acid concentrations is from 75 to 90 wt. percent while the preferred temperature range is from 15° C. to 40° C. In order to maintain the highest selectivity toward tertiary olefins the acid strength and temperature employed should be correlated one with the other as, for example, when using an aqueous acid of 90 wt. percent strength, a temperature of substantially 0° C. should be maintained in order to prevent undesirable side reactions such as polymerization or normal olefin hydration. If aqueous acid solutions of less than 90 wt. percent strength are employed higher temperatures can be used and the necessity for refrigeration is thus removed, as for example, aqueous acid solutions of 75 to 90 wt. percent strength are effective at substantially room temperature without incurring any undesirable secondary reactions.

The strong organic sulfonic acid used should be one which is highly ionized in water and stable in aqueous solution at temperatures up to 100° C. such as, for example, aromatic sulfonic acids, like benzene sulfonic acid, toluene sulfonic acid and naphthalene sulfonic acid; aliphatic sulfonic acids, like ethane sulfonic acid, octyl sulfonic acid, cetyl sulfonic acid and Turkey red oil and the halogen and nitro substituted aliphatic and/or aromatic sulfonic acids. The polybasic mineral acid-acting substance employed to modify the sulfonic acid may be sulfuric acid, phosphoric acid, $H_2S_2O_7$, $HPO_3$, $H_4P_2O_7$, $ClSO_3H$, $FSO_3H$, etc., or mineral acid acting salts which form mineral acids with water, e. g. $ZnSO_4$, $NaHSO_4$, $Al_2(SO_4)_3$, $NaH_2PO_4$, etc.

When the hydrocarbons come in contact with the aqueous acid under the conditions outlined above the tertiary olefins contained therein are converted or hydrated directly to the corresponding tertiary alcohol. The alcohols thus formed are soluble primarily in the aqueous acid layer but also to some extent in the unreacted hydrocarbons, and provision may be necessary for their recovery from both phases. From the aqueous acid layer the alcohols are recovered simply by dilution, steam distillation and condensation. The alcohols present in the unreacted hydrocarbons can be recovered in any one of several ways. If the reaction is conducted in the vapor phase the alcohols may be recovered by fractionation. Where the reaction is conducted in the liquid phase the alcohols may be recovered from the hydrocarbon layer by fractionation; by solvent extraction with glycols, phenols, or other organic solvents not miscible with the hydrocarbon layer or where the alcohols are water-soluble they can be removed from the hydrocarbon layer by washing with water. Since the hydration of the olefin removes water from the aqueous acid, care should be taken where the process is run continuously to maintain the concentration of the acid substantially constant by either continuous or intermittent addition of water to the acid. This can be accomplished by feeding water along with the hydrocarbons or acid in an amount sufficient to compensate for the olefins hydrated or the water can be added to the acid as the reaction progresses. The unreacted hydrocarbons containing all of the normal olefins as well as the various saturated hydrocarbons can then be treated to obtain valuable derivatives of the normal olefins.

If desired, the acid extract containing the tertiary alcohols formed in the hydration reaction may be subjected with or without further dilution to controlled steam stripping whereby the tertiary olefin itself is recovered in concentrated form. Alternatively, the alcohol solution may be heated directly to polymerize the tertiary olefin to its dimer or trimer, or the acid solution of the alcohols may be used directly in effecting chemical reactions between the reacted olefin and other added reactants.

The mixed sulfonic acid-polybasic mineral acid-acting substance may become contaminated during the extraction operation with surface active agents which lead to foaming, emulsification, etc. These surface active agents can be removed by washing the acid phase with a suitable non-reactive immiscible solvent. Petroleum naphthas, benzene, etc., have been found to be particularly effective for this purpose.

Having described the invention in a manner so that it may be practiced by one skilled in the art, what is claimed is:

1. The method of selectively removing tertiary olefins from mixtures of hydrocarbons containing both tertiary and normal olefins which comprises selectively absorbing the tertiary olefins by contacting the mixture with an aqueous solution of a mixture of an organic sulfonic acid and a water-soluble polybasic mineral acid, said mixture containing 20 to 45 mol percent total acid of which the polybasic mineral acid represents from 10 to 75 mol percent of the total acids.

2. The method according to claim 1 in which the absorption is carried out at a temperature between 0° C. and 50° C.

3. The method according to claim 1 in which the polybasic mineral acid is present in amounts from 10 to 50 mol percent of the total acids.

4. The method according to claim 3 in which the absorption is carried out at a temperature in the range of 15° C. to 40° C.

5. The method of selectively removing tertiary olefins from mixtures of hydrocarbons containing both tertiary and normal olefins which comprises selectively absorbing the tertiary olefins by contacting the mixture with an aqueous solution of a mixture of benzenesulfonic acid and a water-soluble polybasic mineral acid, said mixture containing 20 to 45 mol percent total acid of which the polybasic mineral acid represents from 10 to 75 mol percent of the total acids.

6. The method according to claim 5 in which the polybasic mineral acid is sulfuric acid.

7. The method according to claim 6 in which the absorption is carried out at a temperature in the range of 0° C. to 50° C.

8. The method according to claim 6 in which the absorption is carried out at a temperature in the range of 15° C. to 45° C.

9. The method of selectively removing tertiary olefins containing from 4 to 8 carbon atoms per molecule from $C_4$–$C_8$ hydrocarbon mixtures containing both tertiary and normal olefins which comprises selectively absorbing the tertiary olefins by contacting the mixture with an aqueous solution of a mixture of an organic sulfonic acid and a water-soluble polybasic mineral acid, said mixture containing 20 to 45 mol percent total acid of which the polybasic mineral acid represents from 10 to 75 mol percent of the total acids.

10. The method of selectively removing tertiary amylenes from $C_5$ hydrocarbon mixtures containing both tertiary and normal amylenes which comprises selectively absorbing the tertiary amylenes by contacting the mixture with an aqueous solution of a mixture of benzenesulfonic acid and sulfuric acid, said mixture containing 20 to 45 mol percent total acid of which the sulfuric acid represents from 10 to 75 mol percent of the total acids, while maintaining the acid mixture at a temperature between 0° C. and 50° C. during the absorption.

11. The method according to claim 10 in which the sulfuric acid represents from 10 to 50 mol percent of the total acids and in which the absorption is carried out at temperatures between 15° C. and 40° C.

BOYD E. HUDSON, JR.

REFERENCES CITED

The following references are of record in the file of this patent:

UNITED STATES PATENTS

| Number | Name | Date |
|---|---|---|
| 2,400,376 | Showalter | May 14, 1946 |
| 2,426,088 | Filbert | Aug. 19, 1947 |